(12) United States Patent
Stahl et al.

(10) Patent No.: US 10,112,339 B2
(45) Date of Patent: Oct. 30, 2018

(54) METHOD FOR MAKING AN ENCLOSURE

(71) Applicant: EXTENET SYSTEMS, INC., Lisle, IL (US)

(72) Inventors: Gary D. Stahl, Londonderry, NH (US); Gregory L. Klosowski, Oak Park, IL (US); Rick Conklin, Bellefonte, PA (US)

(73) Assignee: Extenet Systems, Inc., Lisle, IL (US)

( * ) Notice: Subject to any disclaimer, the term of this patent is extended or adjusted under 35 U.S.C. 154(b) by 210 days.

(21) Appl. No.: 15/374,565

(22) Filed: Dec. 9, 2016

(65) Prior Publication Data

US 2017/0151705 A1   Jun. 1, 2017

Related U.S. Application Data

(62) Division of application No. 13/890,003, filed on May 8, 2013, now Pat. No. 9,517,586.

(51) Int. Cl.
| | | |
|---|---|---|
| *B29C 51/26* | (2006.01) | |
| *B29C 51/10* | (2006.01) | |
| *B29C 65/48* | (2006.01) | |
| *B29C 65/56* | (2006.01) | |
| *B29C 65/00* | (2006.01) | |
| *B29L 31/34* | (2006.01) | |

(52) U.S. Cl.
CPC ............ *B29C 51/267* (2013.01); *B29C 51/10* (2013.01); *B29C 65/48* (2013.01); *B29C 65/562* (2013.01); *B29C 66/543* (2013.01); *B29C 66/545* (2013.01); *B29C 2791/006* (2013.01); *B29K 2995/0003* (2013.01); *B29L 2031/3481* (2013.01)

(58) Field of Classification Search
None
See application file for complete search history.

(56) References Cited

U.S. PATENT DOCUMENTS

2005/0237184 A1   10/2005   Muirhead

OTHER PUBLICATIONS

Equipment Specifications, Thomas Pilfer and Partners, New York Wireless, New York, NY, Jan. 25, 2006, pp. A07, A17, A22 and A24.

*Primary Examiner* — Monica A Huson
(74) *Attorney, Agent, or Firm* — McDonnell Boehnen Hulbert & Berghoff LLP

(57) ABSTRACT

An enclosure for housing electrical equipment is disclosed. The enclosure is produced by thermoforming four separate pieces or bodies together to form the top and bottom of the enclosure. The enclosure is made of a moldable material, such as plastic or fiberglass.

9 Claims, 3 Drawing Sheets

METHOD FOR MAKING AN ENCLOSURE

This application is a divisional application of, and claims priority to, U.S. patent application Ser. No. 13/890,003 filed on May 8, 2013, and entitled "Method for Making an Enclosure," which is hereby incorporated by reference. This application relates to the field of enclosures for electrical components, and more particularly, to a method of making an enclosure for various telecommunications equipment by a thermoforming process.

BACKGROUND

Field of the Application

Description of the Related Art

The New York City Department of Information Technology & Telecommunications (DoITT) is responsible for granting and administering all telecommunications franchises for New York City. A franchise is a contract entered into by the City with a private entity for the provision of a public service utilizing the City's streets and other rights of way. Telecommunications franchises allow for the installation and maintenance of wire, cable, optical fiber, conduit, antennas and other structures on, over and under the City's streets to facilitate the transmission of video, voice, and data.

DoITT has approved specifications and requirements for these electrical components which must be followed by the franchises. One requirement for an enclosure for telecommunications equipment is that the enclosure be made in a very specific size with specific shapes and details.

It would be beneficial in some applications for these enclosures to be made of a radio-frequency (RF) transparent material, such as plastic or fiberglass, so an antenna could be placed within the enclosure. Plastic parts are typically either injection molded or thermoformed. Thermoforming is the preferred process, due to significantly reduced expense, but the design required by DoITT requires the production of overlapping joints or transitions. These conditions are difficult to achieve without very specific and unique detailing of the cabinet interior. Thus, there is a need to provide a process for constructing these plastic enclosures.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

SUMMARY

In one embodiment, the present application provides a method of making an enclosure for housing at least one electrical component. The method includes thermoforming a first shell from a moldable material, thermoforming a second shell from the moldable material, thermoforming a first body from the moldable material, and thermoforming a second body from the moldable material. The method further includes securing the first body within the first shell to create a first part of the enclosure and securing the second body within the second shell to create a second part of the enclosure.

In another embodiment, a method of making and assembling an enclosure for housing at least one electrical component is provided. The method includes vacuum forming a first shell from a plastic material, vacuum forming a second shell from the plastic material, vacuum forming a first body from the plastic material, and vacuum forming a second body from the plastic material. The method further includes securing the first body within the first shell to create a first part of the enclosure, securing the second body within the second shell to create a second part of the enclosure, and securing the first part to the second part.

In yet another embodiment, an apparatus for housing at least one electrical component is disclosed. The apparatus includes a top part having a first plastic inner body attached to a first plastic outer shell and a bottom part having a second plastic inner body attached to a second plastic outer shell. The second inner body includes a base with upwardly extending side walls and the second outer shell includes a base with upwardly extending side walls. The second inner body is positioned within the second outer shell such that the walls of the second inner body are positioned within the walls of the second outer shell. The second inner body also includes a lip that extends downwardly from the upwardly extending walls. The upwardly extending walls of the second outer shell are positioned between the upwardly extending walls of the second inner body and the lip.

BRIEF DESCRIPTION OF THE DRAWINGS

Exemplary embodiments of the invention are described herein with reference to the drawings, in which.

DETAILED DESCRIPTION

The present application is directed to an enclosure which may be used for housing electrical equipment, such as antennas, transformers, routers, network interface devices, and/or wireless access points, for example. Other electrical equipment may be provided within the enclosures as well. The antennas may be used for mobile telecommunications services. As mentioned above, certain specifications and configurations are required by DoITT for the specific design of both the antennas and the enclosures associated with the antennas. The present application describes a method for making an enclosure from a moldable material using a thermoforming process, which conforms to the specifications and configurations of DoITT.

Figure 1:
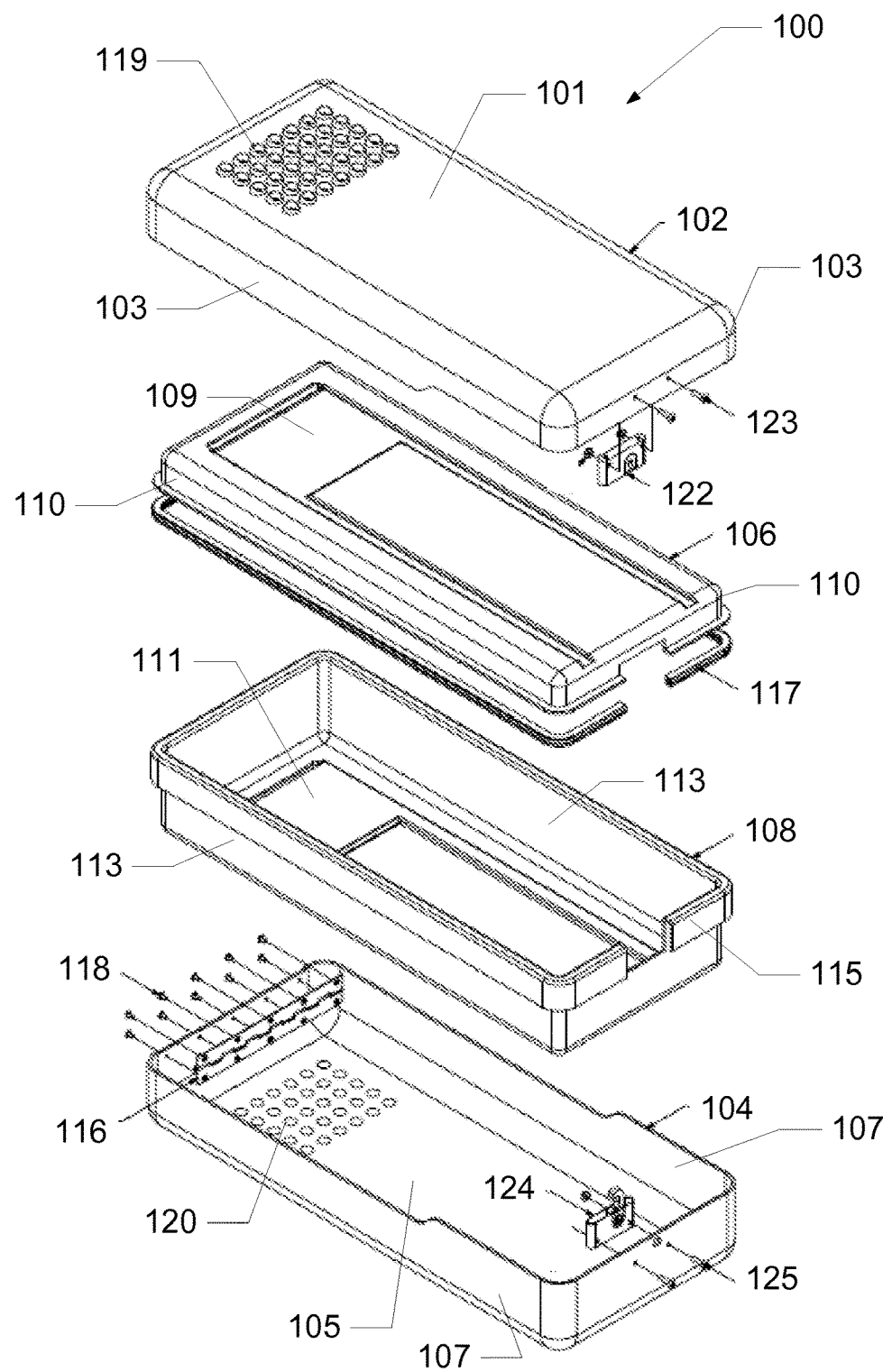
FIG. 1 is an exploded view of an embodiment of an enclosure of the present application.

Turning now to the Figures, an enclosure 100 in accordance with the present application is shown in FIG. 1. The enclosure 100 may include a first or top outer shell 102 and a second or bottom outer shell 104. The top outer shell 102 includes a base 101 with downwardly extending side walls 103, and the bottom outer shell 104 includes a base 105 with upwardly extending side walls 107. The top shell 102 may include a plurality of vents 119, and the bottom shell 104 may also include a plurality of vents 120, as required by the DoITT specifications.

The top shell 102 may further include a first or top inner body 106 positioned within the top shell 102. Similarly, the bottom shell 104 may further include a second or bottom inner body 108 positioned within the bottom shell 104. The top inner body 106 includes a base 109 with downwardly extending walls 110, and the bottom inner body 108 includes a base 111 with upwardly extending walls 113. The bottom inner body 108 may include a lip 115. The lip 115 creates a back plane for the curve of the bottom outer shell 104, so that the walls of the enclosure 100 are weather resistant without any gaps exposing the interior of the enclosure 100 to the exterior. A gasket 117 may also be located between the top inner body 106 and the bottom inner body 108. The gasket 117 may be made of rubber to create a weather tight seal to protect the enclosure 100 from the elements.

The enclosure 100, including the top and bottom shells 102, 104 and the top and bottom inner bodies 106, 108, may be made from a moldable material, such as plastic or fiberglass, for example. Other moldable materials may be used as well. In some embodiments, the moldable material is constructed such that the material allows radio-frequency (RF) signals to be transmitted in and out of the enclosure 100.

The enclosure 100 is formed by thermoforming the top and bottom outer shells 102, 104, as well as the top inner body 106 and the bottom inner body 108. In one example, the components are formed by vacuum forming. In some embodiments, other thermoforming methods may also be used, such as pressure forming, for example.

Figure 3:
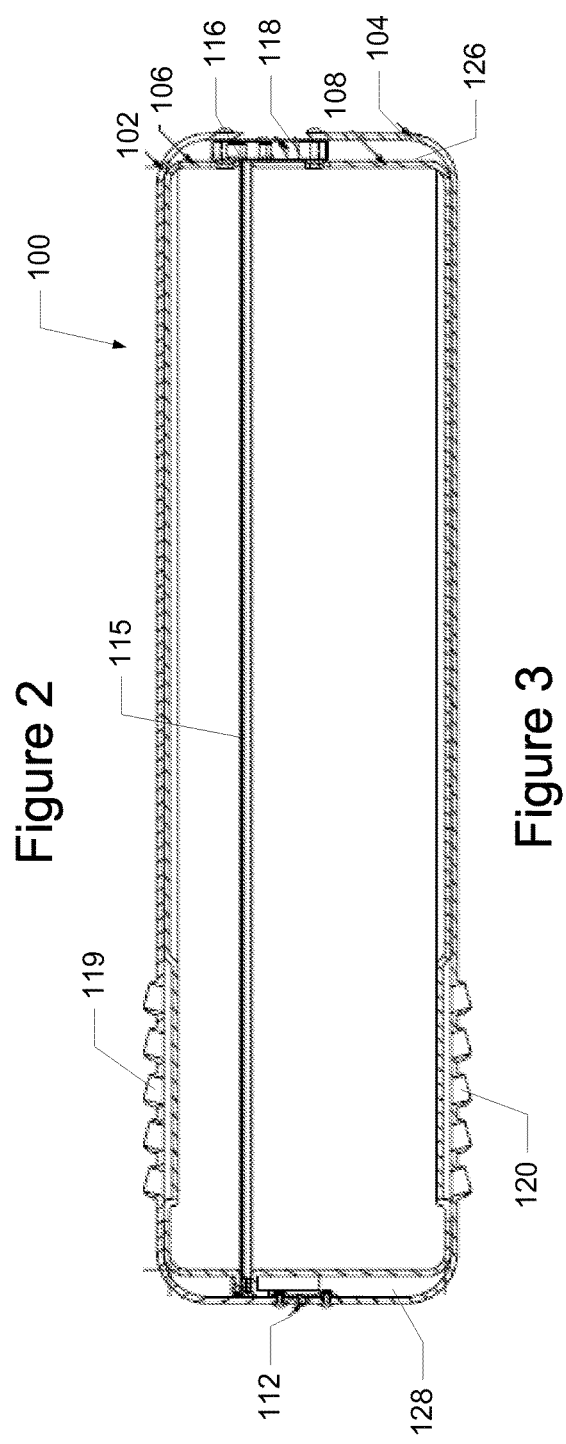
FIG. 3 is a cross-sectional view of the enclosure along line B-B shown in FIG. 2.

After the shells 102, 104 and the bodies 106, 108 are each formed individually, the top inner body 106 is secured within the top outer shell 102 to create a first or top part 112 of the enclosure 100, and the bottom inner body 108 is secured within the bottom outer shell 104 to create a second or bottom part 114 of the enclosure, which can be best seen in FIG. 3. In one embodiment, the bodies 106, 108 are secured within the respective shells 102, 104 by adhesive, such as an industrial strength glue, for example. However, it should be understood that the bodies 106, 108 may be secured within the respective shells 102, 104 by any suitable securing means.

Once the first and second parts 112, 114 of the enclosure are assembled, a fastening mechanism 116 may be used to secure the first part 112 to the second part 114. In one embodiment, the fastening mechanism 116 may comprise a hinge which may be secured to the top outer shell 102 and the bottom outer shell 104 by a plurality of screws 118. However, it should be understood that the two parts may be secured together by any suitable fastening mechanism.

The enclosure 100 may further include a locking mechanism to lock the enclosure. In one embodiment, the locking mechanism may comprise a latch 122, 124, as shown in FIG. 1. The latch may include a first or top portion 122 secured to the top shell 102 by a plurality of fasteners 123, and a second or bottom portion 124 secured to the bottom shell 104 by a plurality of fasteners 125. In operation, when the two parts 112, 114 of the enclosure 100 are closed together, the latch locks the enclosure. To open the enclosure 100, the latch may be unlocked by a key, for example. In alternate embodiments, other suitable locking mechanisms may be used.

Figure 2:
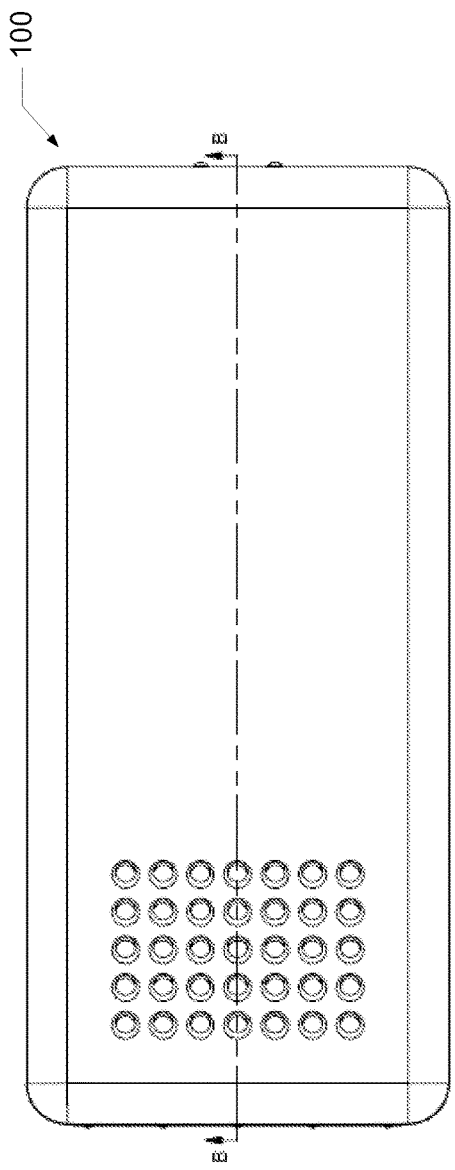
FIG. 2 is a top view of the enclosure.

Referring now to FIGS. 2 and 3, the top and cross-sectional views of the enclosure 100 are shown. As can be seen in FIG. 3, the top inner body 106 is secured within the top outer shell 102 and the bottom inner body 108 is secured within the bottom outer shell 104. Further, it can be seen that the outer shells 102, 104 do not abut each other when the enclosure is in a closed position, per the requirements of the DoITT specifications. Thus, the lip 115 of the bottom inner body 108 is exposed to the exterior.

FIG. 3 also shows front space 124 and back space 126 that exist between the outer shells 102, 104 and the inner bodies 106, 108. The spaces 126, 128 are formed when the inner bodies 106, 108 are secured within the top shells 102, 104.

Figure 4:
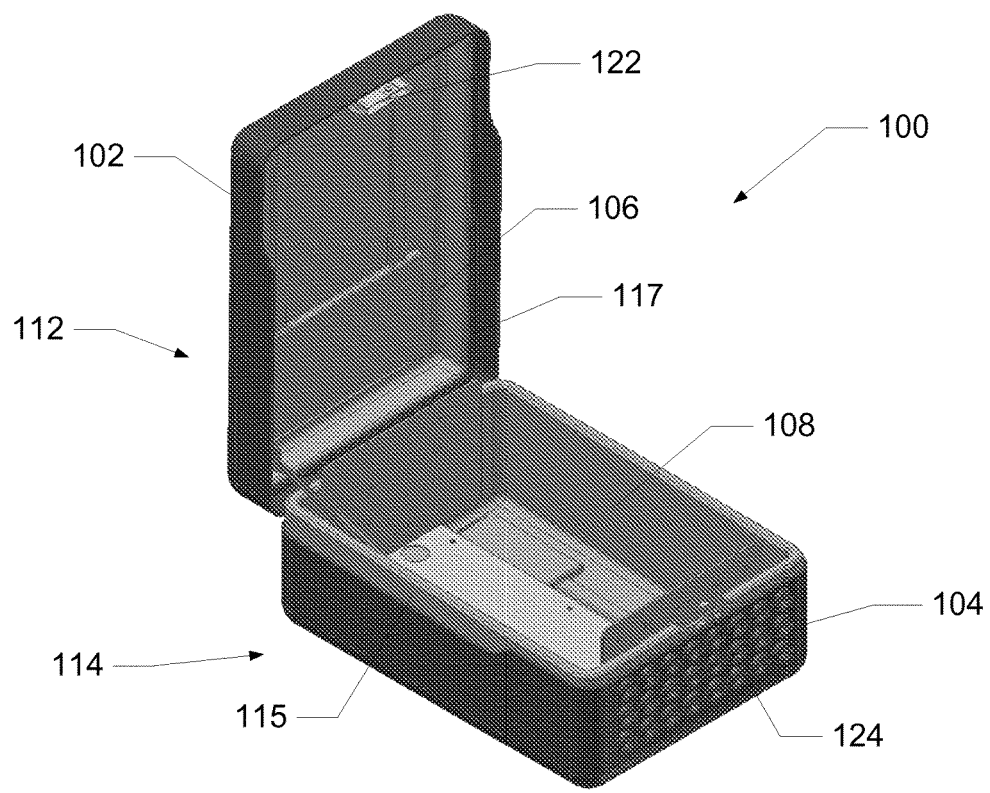
FIG. 4 is a perspective view of the assembled enclosure shown in FIG. 1 in an open position.

Referring now to FIG. 4, the enclosure 100 is shown in an open position, with the bodies 106, 108 secured within their respective top and bottom shells 102, 104, and after the two parts 112, 114 of the enclosure have been secured together. Electrical equipment may be located in various positions within the enclosure 100.

Figure 5:
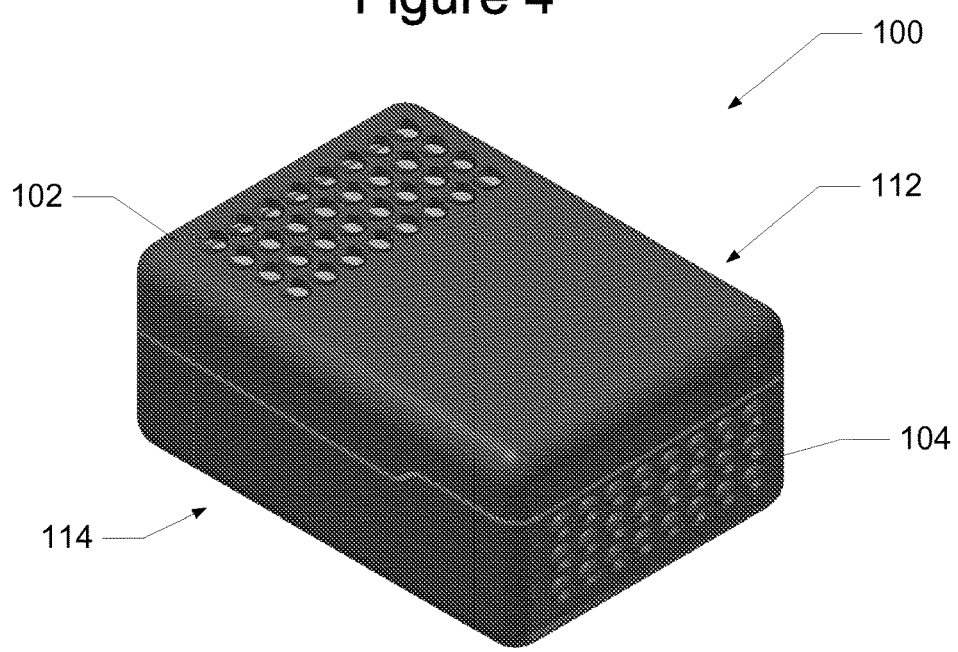
FIG. 5 is a perspective view of the assembled enclosure shown in FIG. 1 in a closed position.

FIG. 5 shows the enclosure 100 with the bodies 106, 108 secured within their respective top and bottom shells 102, 104, and in a closed and locked position.

While various aspects and embodiments have been disclosed, other aspects and embodiments will be apparent to those skilled in the art. The various aspects and embodiments provided in this disclosure are for purposes of illustration and are not intended to be limiting, with the true scope being indicated by the following claims, along with the full scope of equivalents to which the claims are entitled.

What is claimed is:

1. An apparatus for housing at least one electrical component, the apparatus comprising:
   a top part being comprised of a first plastic inner body attached to a first plastic outer shell;
   a bottom part being comprised of a second plastic inner body attached to a second plastic outer shell;
   wherein the second inner body comprises a base with upwardly extending side walls and the second outer shell comprises a base with upwardly extending side walls;
   wherein the second inner body is positioned within the second outer shell such that the walls of the second inner body are positioned within the side walls of the second outer shell;
   wherein the second inner body includes a lip that extends downwardly from the upwardly extending side walls; and
   wherein the lip is positioned within the upwardly extending side walls of the base of the second outer shell.

2. The apparatus of claim 1, wherein the first inner body comprises a base with downwardly extending side walls and the first outer shell comprises a base with downwardly extending side walls; and
   wherein the first inner body is positioned within the first outer shell such that the walls of the first inner body are positioned within the walls of the first outer shell.

3. The apparatus of claim 2, wherein there is a first space located between the first inner body and the first outer shell and a second space located between the second inner body and the second outer shell.

4. The apparatus of claim 1, wherein the first inner body and first outer shell are vacuum formed, and the second inner body and second outer shell are vacuum formed.

5. The apparatus of claim 1, wherein adhesive is used to attach the first inner body to the first outer shell and the second inner body to the second outer shell.

6. The apparatus of claim 1, wherein the first inner body comprises a base with downwardly extending side walls and the first outer shell comprises a base with downwardly extending side walls, and wherein the first inner body is positioned within the first outer shell such that the walls of the first inner body are positioned within the walls of the first outer shell.

7. The apparatus of claim 6, wherein the lip is also positioned within the downwardly extending walls of the first outer shell when the first outer shell is in a closed position with respect to the second outer shell.

8. The apparatus of claim 7, wherein the lip is exposed to an exterior of the enclosure when the when the first outer shell is in a closed position with respect to the second outer shell.

9. The apparatus of claim 1, wherein the first inner body is positioned within the first outer shell to form a double-walled top part of the enclosure; and wherein the second inner body is positioned within the second outer shell to form a double-walled bottom part of the enclosure.

\* \* \* \* \*